(12) United States Patent
Sakasegawa

(10) Patent No.: US 7,904,632 B2
(45) Date of Patent: Mar. 8, 2011

(54) CONNECTION DEVICE FOR SELECTING AN OPTIMUM RECEIVER

(75) Inventor: Yosuke Sakasegawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1091 days.

(21) Appl. No.: 11/652,537

(22) Filed: Jan. 12, 2007

(65) Prior Publication Data

US 2007/0178835 A1 Aug. 2, 2007

(30) Foreign Application Priority Data

Jan. 18, 2006 (JP) .................. 2006-010441
Jul. 28, 2006 (JP) .................. 2006-206507

(51) Int. Cl.
*G06F 13/00* (2006.01)
*G06F 13/12* (2006.01)
*G06F 13/36* (2006.01)

(52) U.S. Cl. .......... 710/316; 710/62; 710/306; 710/311; 710/317

(58) Field of Classification Search ............ 710/62, 710/306, 311, 316, 317
See application file for complete search history.

(56) References Cited

U.S. PATENT DOCUMENTS

| | | | | |
|---|---|---|---|---|
| 5,999,612 A | * | 12/1999 | Dunn et al. ............ | 379/212.01 |
| 7,319,695 B1 | * | 1/2008 | Agarwal et al. ............ | 370/388 |
| 7,586,909 B1 | * | 9/2009 | Walrand et al. ............ | 370/388 |
| 2002/0196490 A1 | * | 12/2002 | Smith ............ | 359/118 |
| 2003/0182441 A1 | * | 9/2003 | Andrew et al. ............ | 709/237 |
| 2005/0238020 A1 | * | 10/2005 | Hetzel et al. ............ | 370/390 |
| 2008/0069146 A1 | * | 3/2008 | Krumme ............ | 370/477 |
| 2008/0212472 A1 | * | 9/2008 | Musacchio et al. ............ | 370/232 |
| 2009/0320073 A1 | * | 12/2009 | Reisman ............ | 725/51 |

FOREIGN PATENT DOCUMENTS

JP 2004-312191 11/2004

* cited by examiner

*Primary Examiner* — Alford W Kindred
*Assistant Examiner* — Farley J Abad
(74) *Attorney, Agent, or Firm* — Pillsbury Winthrop Shaw Pittman, LLP

(57) ABSTRACT

A connection device for selecting an optimum receiver includes a single first port, in which a transmitter is connected via a bidirectional type cable, and a plurality of second ports, in which a plurality of receivers are connected via respective bidirectional type cables. The connection device further includes a transmission control unit which acquires transmitter function information from the transmitter via the first port as well as acquiring receiver function information from each of the plurality of receivers via their respective second ports. A transmission control unit links together the first port and the respective second port from among the plurality of second ports, which is connected to the receiver which is endowed with receiver function information closest to the transmitter function information.

2 Claims, 10 Drawing Sheets

16A : DEVICE INFORMATION TABLE

| DEVICE | IMAGE FUNCTIONS | | ... | AUDIO FUNCTIONS | ... |
|---|---|---|---|---|---|
| | RESOLUTION | ASPECT RATIO | | AUDIO FORMAT | |
| | | | | DOLBY DIGITAL | |
| TRANSMITTER 2 | 480P, 720P SUPPORT | 4:3 16:9 SUPPORT | ... | SUPPORT | ... |
| RECEIVER 3 | 480P SUPPORT | 4:3 SUPPORT | ... | SUPPORT AVAILABLE | ... |
| RECEIVER 4 | 480P, 720P SUPPORT | 4:3 16:9 SUPPORT | ... | SUPPORT AVAILABLE | ... |
| RECEIVER 5 | 480P, 720P SUPPORT | 4:3 16:9 SUPPORT | ... | NOT SUPPORTED | ... |

FIG.3

16A: DEVICE INFORMATION TABLE

| DEVICE | IMAGE FUNCTIONS | | | AUDIO FUNCTIONS | |
| --- | --- | --- | --- | --- | --- |
| | RESOLUTION | ASPECT RATIO | ... | AUDIO FORMAT | ... |
| TRANSMITTER 2 | 480P,720P SUPPORT | 4:3 16:9 SUPPORT | ... | DOLBY DIGITAL SUPPORT | ... |
| RECEIVER 3 | 480P,720P SUPPORT | 4:3 SUPPORT | ... | SUPPORT AVAILABLE | ... |
| RECEIVER 4 | 480P,720P SUPPORT | 4:3 16:9 SUPPORT | ... | NOT SUPPORTED | ... |
| RECEIVER 5 | 480P SUPPORT | 4:3 SUPPORT | ... | NOT SUPPORTED | ... |

FIG.4

16B : DEVICE INFORMATION TABLE

| DEVICE | IMAGE FUNCTIONS | | | AUDIO FUNCTIONS | |
| --- | --- | --- | --- | --- | --- |
| | RESOLUTION | ASPECT RATIO | ... | AUDIO FORMAT | ... |
| TRANSMITTER 2 | 480P,720P SUPPORT | 4:3 16:9 SUPPORT | ... | DOLBY DIGITAL SUPPORT | ... |
| RECEIVER 3 | 480P,720P SUPPORT | 4:3 SUPPORT | ... | NOT SUPPORTED | ... |
| RECEIVER 4 | 480P,720P SUPPORT | 4:3 16:9 SUPPORT | ... | NOT SUPPORTED | ... |
| RECEIVER 5 | 480P SUPPORT | 4:3 SUPPORT | ... | NOT SUPPORTED | ... |
| REPEATER 9 | — | — | ... | SUPPORT AVAILABLE | ... |

FIG.8

16B: DEVICE INFORMATION TABLE

| DEVICE | IMAGE FUNCTIONS | | ... | AUDIO FUNCTIONS | ... |
| --- | --- | --- | --- | --- | --- |
| | RESOLUTION | ASPECT RATIO | | AUDIO FORMAT | |
| TRANSMITTER 2 | 480P, 720P SUPPORT | 4:3 16:9 SUPPORT | ... | DOLBY DIGITAL SUPPORT | ... |
| RECEIVER 3 | 480P, 720P SUPPORT | 4:3 SUPPORT | ... | SUPPORT AVAILABLE | ... |
| RECEIVER 4 | 480P, 720P SUPPORT | 4:3 16:9 SUPPORT | ... | NOT SUPPORTED | ... |
| RECEIVER 5 | 480P SUPPORT | 4:3 SUPPORT | ... | NOT SUPPORTED | ... |
| REPEATER 9 | — | — | ... | NOT SUPPORTED | ... |

FIG.9

CONNECTION DEVICE FOR SELECTING AN OPTIMUM RECEIVER

CROSS REFERENCE

This Nonprovisional Application claims priority under 35 U.S.C. §119(a) on Patent Applications No. 2006-010441 and No. 20067206507 filed in Japan on Jan. 18, 2006, and Jul. 28, 2006 respectively, the entire contents of which are hereby incorporated by reference.

BACKGROUND OF THE INVENTION

In the past, a transmitter and a receiver have been connected together via a bidirectional type interface. The transmitter may be, for example, a personal computer or a DVD player. Moreover, the receiver may be, for example, a monitor, a television, a speaker, or the like. Furthermore, the bidirectional type interface may be, for example, a HDMI (High Definition Multimedia Interface) type interface.

In the state in which these devices are connected together by the bidirectional type interface, the transmitter transmits image data or audio data. And the receiver receives this data and outputs it to the exterior of these devices as a replay signal. Due to this the user is enabled, with this receiver, to view an image based upon the replay signal, or to listen to audio based upon the replay signal.

Here, if there are a plurality of these receivers which it is desired to connect to a transmitter, then the user must select and connect one from among this plurality of receivers. By connecting these two devices together, the image data or audio data which is transmitted from the transmitter is replayed upon this one particular receiver.

On the other hard, a device control device such as described in Japanese Laid-Open Patent Publication 2004-312191 has been proposed.

However, a problem arises when connecting together the transmitter and that receiver which is endowed with functions which are closest to at least one of the functions of the transmitter during image output and its functions during audio output (hereinafter termed the "optimal receiver"). In detail, since in this case the connection is manually performed, the user must first select the optimum receiver from the plurality of receivers. And, in order to select the optimum receiver, the user must ascertain the functions of the transmitter and the receivers (hereinafter these will collectively be termed the "devices in use"). However, it is difficult for a typical user thus to ascertain the functions of the devices in use.

Due to this, in the above described prior art example, it has been difficult for the user to connect together the transmitter and the optimum receiver. Accordingly, it has not been possible for the user adequately to deploy the functions of the transmitter during image output and also its functions during audio output.

Furthermore, with a device control device such as the one described in Japanese Laid-Open Patent Publication 2004-312191, the device which is the subject of control is changed over automatically based upon protocol information and interface information. However, the device of this publication does not automatically connect together the transmitter and the optimum receiver.

The object of the present invention is to provide a connection device for selecting an optimum receiver which automatically selects the optimum receiver from a plurality of receivers and connects them together this optimum receiver and the transmitter, and which thus makes it possible adequately to deploy the function of the transmitter during image output and also its functions during audio output.

SUMMARY OF THE INVENTION

The connection device for selecting an optimum receiver according to the present invention includes a single first port to which is connected, via a bidirectional type cable, a transmitter which transmits image data or audio data. Moreover, this connection device for selecting an optimum receiver also includes a plurality of second ports to which are connected, via respective bidirectional type cables, a plurality of receivers which receive the image data or audio data and output the image data or audio data as a replay signal.

In this structure the transmitter is, for example, a personal computer or a DVD player. Moreover, the receiver may be, for example, a monitor, a television, a speaker, or the like. Furthermore, the interface standard may be, for example, the HDMI (High Definition Multimedia Interface) standard.

Furthermore, the connection device for selecting an optimum receiver includes a transmission control unit which links together the first port and any one of the plurality of the second ports.

And this transmission control unit operates as follows.

(1) Along with acquiring transmitter function information from the transmitter which specifies on least one of the functions of the transmitter during image output and the functions of the transmitter during audio output, it also acquires receiver function information from each of the plurality of receivers which specifies at least one of the functions of the receiver during image processing and the functions of the receiver during audio processing. In this (1), the function information may be, for example, EDID (Extended Display Identification Data).

(2) From among the plurality of receivers, it selects, as an optimum receiver, that receiver which is endowed with 25 receiver function information closest to the transmitter function information. In this (2), the transmission control unit selects the optimum receiver from among the plurality of receivers.

(3) It links together the first port and that second port, 5 among the plurality of second ports, which is connected to the optimum receiver.

(4) After this linkage, the image data or the audio data which is transmitted between the transmitter and the optimum receiver is relayed via the transmission control unit.

With this structure, the above described transmission control unit changes the linking method between the first port and the second port, according to the transmitter function information which is acquired from the transmitter, and the receiver function information which is acquired from the plurality of receivers. And the result is that the transmission control unit automatically connects together the optimum receiver and the transmitter.

BRIEF DESCRIPTION OF THE DRAWINGS

FIG. 3 is a figure showing a first example of a format for contents stored in a device information table 16A of this connection device for selecting an optimum receiver which is an embodiment of the present invention;

FIG. 4 is a figure showing a second example of a format for the contents stored in this device information table 16A of the connection device for selecting an optimum receiver which is an embodiment of the present invention;

FIG. 8 is a figure showing a first example of a format for contents stored in a device information table 16B of this connection device for selecting an optimum receiver which is another embodiment of the present invention;

FIG. 9 is a figure showing a second example of a format for the contents stored in this device information table 16B of the connection device for selecting an optimum receiver which is another embodiment of the present invention.

DETAILED DESCRIPTION OF THE INVENTION

In the following, connection devices for selecting an optimum receiver which are embodiments of the present invention will be explained.

Figure 1:
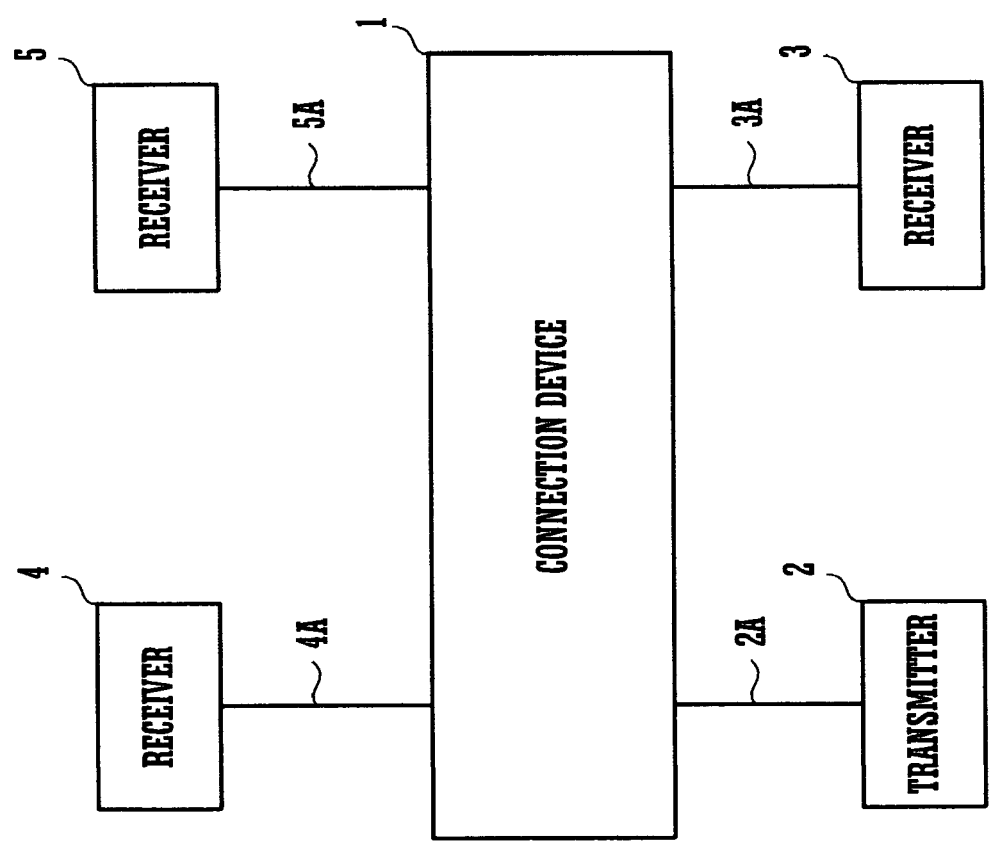
FIG. 1 is a schematic figure showing a situation in which a transmitter and a plurality of receivers are connected together by a connection device for selecting an optimum receiver which is an embodiment of the present invention.

FIG. 1 is a schematic figure showing a situation in which a transmitter and a plurality of receivers are connected together by a connection device for selecting an optimum receiver which is an embodiment of the present invention. This connection device for selecting an optimum receiver 1 is connected to a transmitter 2 via a HDMI cable 2A. The transmitter 2 may be, for example, a personal computer or a DVD player.

Moreover, the connection device for selecting an optimum receiver 1 is connected to a plurality of receivers 3 through 5 via HDMI cables 3A through 5A. These receivers 3 through 5 are monitors comprising audio output units (not shown in the figures) which include speakers.

The connection device for selecting an optimum receiver 1, the transmitter 2, and the plurality of receivers 3 through 5 are all compliant with the HDMI standard. Due to this, it is possible for the connection device for selecting an optimum receiver 1 to perform bidirectional communication with the transmitter 2 and the plurality of receivers 3 through.5.

HDMI is an abbreviation of "High Definition Multimedia Interface". HDMI is an interface for transmitting a digital A/V signal from an output device (a transmitter) such as a DVD player or the like to a display device (a receiver) such as a television receiver or a monitor or the like. HDMI is an extension of DVI (Digital Visual Interface for Computers), which is a previous standard. In concrete terms, by contrast to. DVI which is a standard for transmitting only image data, HDMI is a standard which is capable of transmitting upon a single cable, not only image data, but also audio data and other types of data. Moreover, with HDMI, it is possible to transmit multi channel audio of high quality and also high resolution image signals in various different types of format.

With HDMI, information which is transmitted by the plurality of receivers 3 through 5 and the transmitter 2 to the connection device for selecting an optimum receiver 1 can be transmitted via DDC (Display Date Channel) DDC is a term for a communication format.

The connection device for selecting an optimum receiver 1 relays image data or audio data which is transmitted between the transmitter 2 and the plurality of receivers 3 through 5.

The transmitter 2 transmits image data or audio data. One among the receivers 3 through 5 receives this data via the connection device for selecting an optimum receiver 1, and outputs it as a replay signal. Due to this, upon that receiver, the user can view an image based upon this replay signal, or can listen to audio based upon this replay signal.

Figure 2:
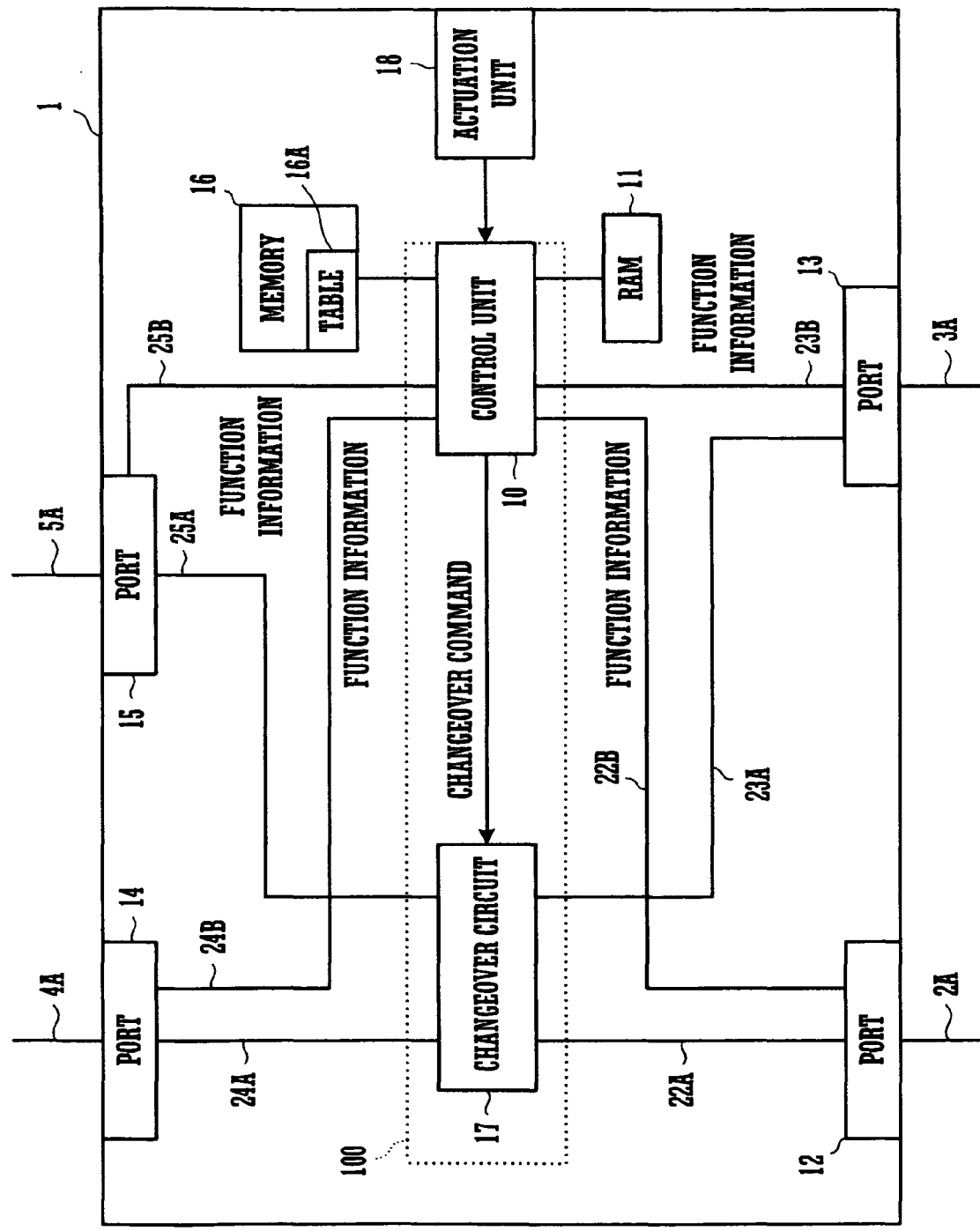
FIG. 2 is a block diagram showing the structure of the main portion of this connection device for selecting an optimum receiver which is an embodiment of the present invention.

FIG. 2 is a block diagram showing the structure of the main portion of this connection device for selecting an optimum receiver which is an embodiment of the present invention. This connection device for selecting an optimum receiver 1 comprises a transmission control unit 100 which controls the operation of the various sections of the connection device for selecting an optimum receiver 1, a memory 16 which stores a control program, a RAM 11 which serves as a working area for keeping data and the like processed by this control program, and an actuation unit 18 which receives actuation input from the user.

Moreover, the connection device for selecting an optimum receiver 1 comprises ports 12 through 15 for connecting the cables 2A through 5A, transmission lines 22A through 25A for transmitting image data or audio data, and control lines 22B through 25B for acquiring function information which will be described hereinafter.

The transmission control unit 100 comprises a changeover circuit 17 which links the transmission line 22A and any one of the transmission lines 23A through 25A, thus connecting the transmitter 2 and any one among the plurality of receivers 3 through 5, and a control unit 10 which controls the operation of the various sections of the connection device for selecting an optimum receiver 1.

It should be understood that, in this embodiment, the port 12 corresponds to the "first port" of the Claims. Moreover, the ports 13 through 15 correspond to the "second ports" of the Claims. And the transmission control unit 100 corresponds to the "transmission control unit" of the Claims. Furthermore, the control unit 10 corresponds to the "selection means", the "first acquisition means", and the "second acquisition means" of the Claims. And the changeover circuit 17 corresponds to the "link means" of the Claims.

The port 12 is a port which is connected to the HDMI cable 2A from the transmitter 2. And the ports 13 through 15 are ports which are connected to the HDMI cables 3A through 5A from the receivers 3 through 5.

The ports 12 through 15 detect the presence or absence of connections between the connection device for selecting an optimum receiver 1 and the transmitter 2 or the receivers 3 through 5 by the HDMI cables 2A through 5A. In concrete terms, the ports 12 through 15 are endowed with a HPD (Hot Plug Detector) function. Moreover, the ports 12 through 15 receive information as to the presence or absence of connection from this HPD. The ports 12 through 15 transmit this information as to the presence or absence of connection, received from this HPD, to the control unit 10 via the transmission lines 22B through 25B, which are internal to the connection device for selecting an optimum receiver 1.

The memory 16 may, for example, consist of an EEPROM. Moreover, a device information table 16A and the control program are stored in the memory 16.

This device information table 16A stores transmitter function information which specifies the functions of the transmitter 2 during image output or during audio output, and receiver function information which specifies the functions of the plurality of receivers 3 through 5 during image processing or during audio processing. This device information table 16A may store this transmitter function information and receiver function information, for example as shown in FIG. 3 or FIG. 4.

FIG. 3 is a figure showing a first example of a format for contents stored in the device information table 16A of this connection device for selecting an optimum receiver which is an embodiment of the present invention. Moreover, FIG. 4 is a figure showing a second example of a format for the contents stored in this device information table 16A of the connection device for selecting an optimum receiver which is an embodiment of the present invention.

It should be understood that the details of FIGS. 3 and 4 will be explained in detail in connection with the subsequent description of the flow chart of FIG. 5.

In the actuation unit 18, there are provided an automatic connection setting key, a power supply key by which the power supply of the connection device for selecting an optimum receiver 1 is turned ON, an automatic connection key for causing automatic connection of the connection device for selecting an optimum receiver to be performed, and various other actuation keys.

The automatic connection setting key will be explained 25 hereinafter with reference to S11 of the FIG. 5 flow chart.

When the actuation unit 18 receives an input from the user, it outputs to the control unit 10 a control signal which corresponds to that command. Moreover, the actuation unit 18 comprises a data reception unit (not shown in the figures) which receives control signals transmitted from a remote control (a remote control terminal) also not shown in the figures.

The control unit 10 may consist, for example, of SRAM and a micro computer. The control unit 10 controls the various sections of the connection device for selecting an optimum receiver 1 according to commands which are inputted from the user.

Next, the operation of the control unit 10 of the connection device for selecting an optimum receiver 1 will be explained.

Figure 5:
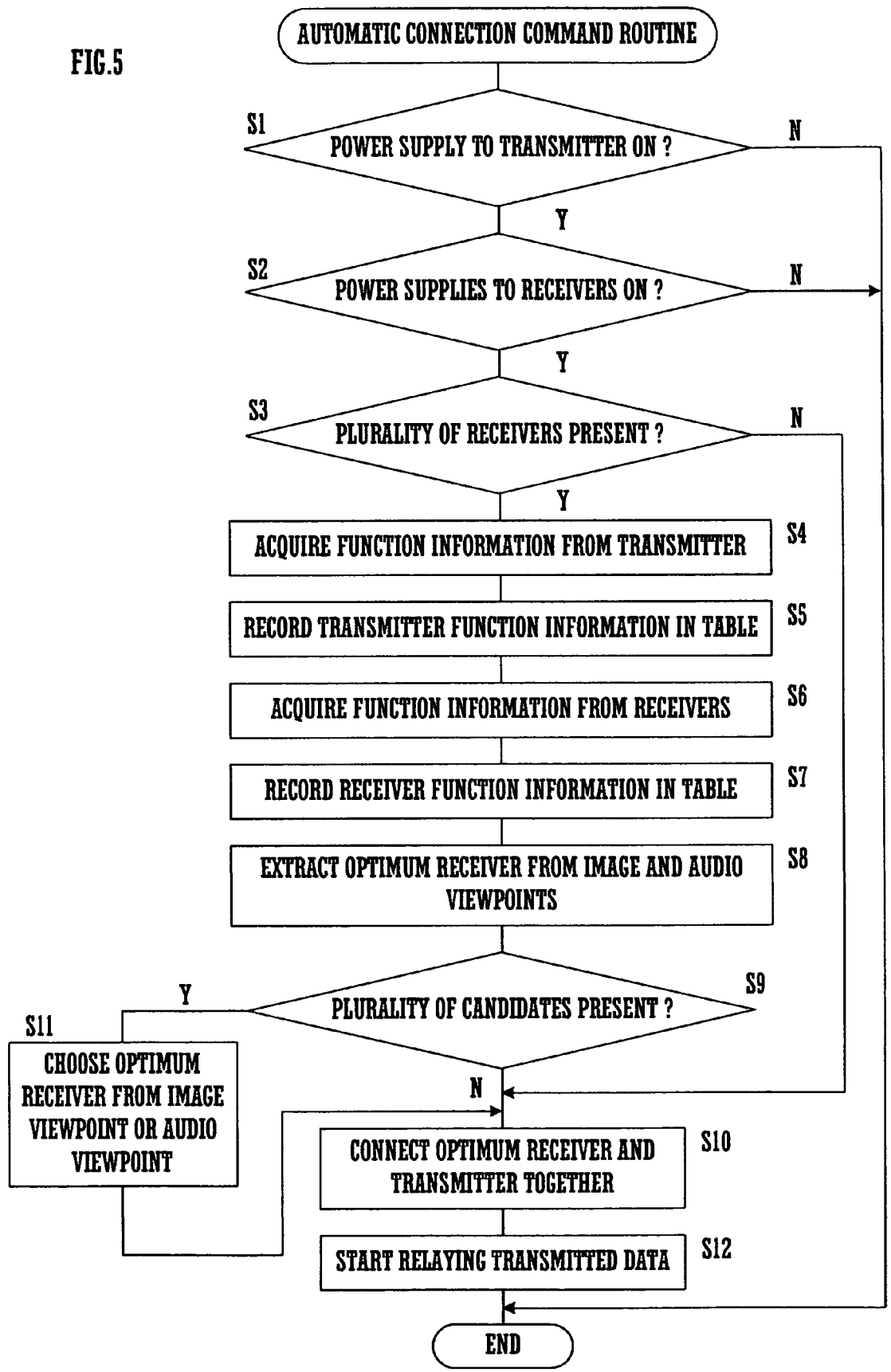
FIG. 5 is a flow chart showing operations performed by a control unit of this connection device for selecting an optimum receiver which is an embodiment of the present invention.

FIG. 5 is a flow chart showing certain operations performed by the control unit 10 of this connection device for selecting an optimum receiver 1 which is an embodiment of the present invention. The operations in FIG. 5 are operations which are performed before starting the relaying of data which is transmitted. And these operations are started, for example, by taking the depression of the automatic connection key of the actuation unit 18 as a trigger.

When the automatic connection key is depressed, the control unit 10 checks the port 12, and decides whether or not the power supply to the transmitter 2 is ON (a step S1). This decision is performed by taking advantage of the HPD function described above.

If it has been decided that the power supply to the transmitter 2 is not ON, then the control unit 10 terminates this processing.

On the other hand, if it has been decided that the power supply to the transmitter 2 is ON, then the control unit 10 checks the ports 13 through 15, and decides whether or not the power supply to each of the receivers 3 through 5 is ON (a step S2). This decision is performed by taking advantage of the HPD function described above.

If it has been decided that the power supply to none of the 10 receivers 3 through 5 is ON, then the control unit 10 terminates this processing.

On the other hand, if it has been decided that the power supply to any one of the receivers 3 through 5 is ON, then the control unit 10 decides whether or not a plurality of receivers are present (a step S3).

If it has been decided that a plurality of receivers are not present, in other words that just one receiver is present, then the control unit 10 connects this receiver and the transmitter 2 to the changeover circuit 17 (a step S10). In this case, the control unit 10 does not need to select the optimum receiver from among the plurality of receivers 3 through 5, since only one receiver is present.

And the control unit 10 starts relaying data which is transmitted between this receiver and the transmitter 2 (a step S12), and then terminates this processing. Subsequently, the transmission control unit 100 relays the data which is transmitted between this receiver and the transmitter 2 via the changeover circuit 17.

On the other hand, if in the step S3 it has been decided that a plurality of receivers are present, then the control unit 10 acquires transmitter function information from the transmitter 2 (a step S4), and records this information in the device information table 16A (a step S5).

Furthermore, the control unit 10 acquires receiver function information from the plurality of receivers (a step S6), and records this information in the device information table 16A (a step S7).

When this is done, the device information table 16A stores this transmitter function information and receiver function information as, for example, shown in FIG. 3 or FIG. 4. Here, this function information is information which indicates the specification or the characteristics of the devices. This function information may be, for example, EDID (Extended Display Identification Data).

Next, the control unit 10 extracts (selects) from the device information table 16A, as the optimum receiver, that receiver which is endowed with functions which are closest to the functions of the transmitter 2 during image output and which are closest to its functions during audio output (a step S8).

The method of extraction during this step S8 will now be explained in concrete terms using FIGS. 3 and 4.

In the first example (refer to FIG. 3) and the second example (refer to FIG. 4), the functions of the transmitter 2 during image output and its functions during audio output are the same. However, the functions of the receivers 3 through 5 during image processing and their functions during audio processing are different.

First, as functions during image output, the transmitter 2 supports resolutions of 480 p (pixels per inch) and of 720 p, and aspect ratios of 4:3 and 16:9 (refer to FIGS. 3 and 4). Moreover, as functions during audio output, the transmitter 2 supports the Dolby Digital audio format (refer to FIGS. 3 and 4).

It should be understood that although, in this embodiment, these first and second examples are explained as examples of extraction, it would also be acceptable for sampling rate, sampling size, image format or the like to be extracted as criteria. Sampling size is also termed quantization bit number.

First, the extraction method of FIG. 8 for the first example (refer to FIG. 3) will be explained in concrete terms.

As shown in FIG. 3, the receivers 3 through 5 support functions during image processing and functions during audio processing. In more detail, as shown in FIG. 3, the receiver 3 supports three of the functions of the transmitter 2. In concrete terms, it supports a resolution of 480 p, an aspect ratio of 4:3, and Dolby Digital. On the other hand, as shown in FIG. 3, the receiver 4 supports all five of the functions of the transmitter 2. Moreover, as shown in FIG. 3, the receiver 5 supports four of the functions of the transmitter 2. In concrete terms, it supports all of the resolutions and all of the aspect ratios thereof.

According to the above, the receiver 4 constitutes the optimum receiver, since it is endowed with functions which are closest to the functions of the transmitter 2 during image output and to its functions during audio output. Due to this, the transmitter 2 and the receiver 4 are connected together in the step S10 which will be described hereinafter.

It should be understood that, if attention is only paid to the functions of the transmitter 2 during image output, as shown in FIG. 3, the receiver 3 supports two of the functions of the transmitter 2. However, the receiver 4 supports four of those functions. Moreover, the receiver 5 support four of those functions. Due to this, from this point of view, both the receiver 4 and the receiver 5 constitute optimum receivers. And, in the same manner, it would also be possible to pay attention only to the functions of the transmitter 2 during audio output.

Next, the extraction method of FIG. 8 for the second example (refer to FIG. 4) will be explained in concrete terms.

As shown in FIG. 4, the receivers 3 through 5 support functions during image processing and functions during audio processing. In more detail, as shown in FIG. 4, the receiver 3 supports four of the functions of the transmitter 2. In concrete terms, it supports all of its functions except the 16:9 aspect ratio. Similarly, as shown in FIG. 4, the receiver 4 supports four of the functions of the transmitter 2. In concrete terms, it supports all of its functions except Dolby Digital. Moreover, as shown in FIG. 4, the receiver 5 supports two of the functions of the transmitter 2. In concrete terms, it supports the. resolution of 480 p and the 4:3 aspect ratio.

According to the above, the receiver 3 and the receiver 4 both constitute optimum receivers, since they are endowed with functions which are closest to the functions of the transmitter 2 during image output and to its functions during audio output. Due to this, in the step S11 which will be described hereinafter, one optimum receiver is chosen from among the receiver 3 and the receiver 4.

It should be understood that, if attention is only paid to the functions of the transmitter 2 during image output, as shown in FIG. 4, the receiver 3 supports three of the image functions of the transmitter 2. However, the receiver 4 supports four of those functions. Moreover, the receiver 5 support two of those functions. Due to this, from this point of view, the receiver 4 constitutes the optimum receiver. And, in the same manner, it would also be possible to pay attention only to the functions of the transmitter 2 during audio output.

Continuing now with the FIG. 5 flow chart, during the extraction by the control unit 10 from the device information table 16A of the optimum receiver in the step S8, it decides whether or not a plurality of candidates for the optimum receiver are present (a step S9).

If it is decided that a plurality of candidates for the optimum receiver are not present, then the control unit 10 changes over the changeover circuit 17 (refer to FIG. 2), and connects together the optimum receiver which has been extracted, and the transmitter 2 (a step S10). In the first example (refer to FIG. 3), it connects together the transmitter 2 and the receiver 4. In more detail, the control unit 10, changes over the changeover circuit 107, and connects together the transmission line 22 and the transmission line 24.

And the control unit 10 starts relaying the data which is transmitted between the single optimum receiver and the transmitter 2 (a step S12), and then terminates this processing. Subsequently, in the first example (FIG. 3.), the transmission control unit 100 relays the data which is transmitted between the receiver 4 and the transmitter 2 via the changeover circuit 17.

Due to the above, it is possible automatically to connect together the transmitter 2 and the optimum receiver. Accordingly, it is possible adequately to deploy the functions of the transmitter 2 during image output and also its functions during audio output.

Furthermore, since it is not necessary for the user to ascertain the image functions or the audio functions of the devices which are in use, accordingly it is possible for the connection to be established without burdening the user with the time and labor which would be required for manually connecting together the transmitter and the optimum receiver.

It should be understood that, if attention is only paid to the functions of the transmitter 2 during image output, in FIG. 4, as described above, the optimum receiver is the receiver 4. Due to this, in the step S10, the transmitter 2 and the receiver 4 are connected together. In this case, it is possible automatically to connect together the transmitter 2 and the optimum receiver 4. Accordingly, it is possible adequately to deploy the functions of the transmitter 2 during image output. Here, in the same manner, if attention is only paid to the functions of the transmitter 2 during audio output, then it is possible adequately to deploy the functions of the transmitter 2 during audio output.

On the other hand, if in the step S9 it has been decided that a plurality of candidates for the optimum receiver are present—in concrete terms, in the case of the second. example (refer to FIG. 4)—then the control unit 10 chooses a single optimum receiver from among this plurality of candidates for the optimum receiver (a step S11). And then the control unit 10 proceeds to the step S10 and continues with processing.

The choosing method of the step S11 will now be described in detail using the second example (refer to FIG. 4).

First, a first choosing method will be explained.

The control unit 10 chooses that one of the receivers from among the plurality of candidates which is endowed with functions which are closest to the functions of the transmitter 2 during image output. And the control unit 10 extracts this one receiver from the device information table 16A as the optimum receiver.

In the above procedure, in the case of the second example (refer to FIG. 4), the plurality of candidates are the receiver 3 and the receiver 4. And, among the receiver 3 and the receiver 4, the single optimum receiver which is endowed with functions which are closest to the functions of the transmitter 2 during image output is the receiver 4, as shown in FIG. 4.

Accordingly, the control unit 10 chooses the receiver 4 from among the plurality of candidates. And the control unit 10 extracts the receiver 4 from the device information table 16A as the optimum receiver.

Next, a second choosing method will be explained.

The control unit 10 chooses that one of the receivers from among the plurality of candidates which is endowed with functions which are closest to the functions of the transmitter 2 during audio output. And the control unit 10 extracts this one receiver from the device information table 16A as the optimum receiver.

In the above procedure, in the case of the second example (refer to FIG. 4), the plurality of candidates are the receiver 3 and the receiver 4. And, among the receiver 3 and the receiver 4, the single optimum receiver which is endowed with functions which are closest to the functions of the transmitter 2 during audio output is the receiver 3, as shown in FIG. 4.

Accordingly, the control unit 10 chooses the receiver 3 from among the plurality of candidates, and extracts the receiver 3 from the device information table 16A as the optimum receiver.

It should be understood that which of the first choosing method and the second choosing method is selected for use, is set in advance by the user with the automatic connection setting key of the actuation unit 18. The step S11 is performed with the choosing method which is thus set in advance.

After the step S11, the control unit 10 connects the optimum receiver and the transmitter 2 to the changeover circuit 17 (a step S10).

And the control unit 10 starts relaying the data which is transmitted between the single optimum receiver and the transmitter 2 (the step S12), and then terminates this processing. Subsequently, the transmission control unit 100 relays the data which is transmitted between the optimum receiver and the transmitter 2 via the changeover circuit 17. Due to the above, it is possible automatically to connect together the transmitter 2 and the optimum receiver.

Furthermore, since it is not necessary for the user to ascertain the image functions or the audio functions of the devices which are in use, accordingly it is possible for the connection to be established without burdening the user with the time and labor which would be required for manually connecting together the transmitter and the optimum receiver.

Furthermore, in the case of the first choosing method, it is possible to select the receiver 4, which is endowed with superior image functions as compared with the other candidates. On the other hand, in the case of the second choosing method, it is possible to select the receiver 3, which is endowed with superior audio functions as compared with the other candidates.

In the following, a connection device for selecting an optimum receiver which is another embodiment of the present invention will be explained.

Figure 6:
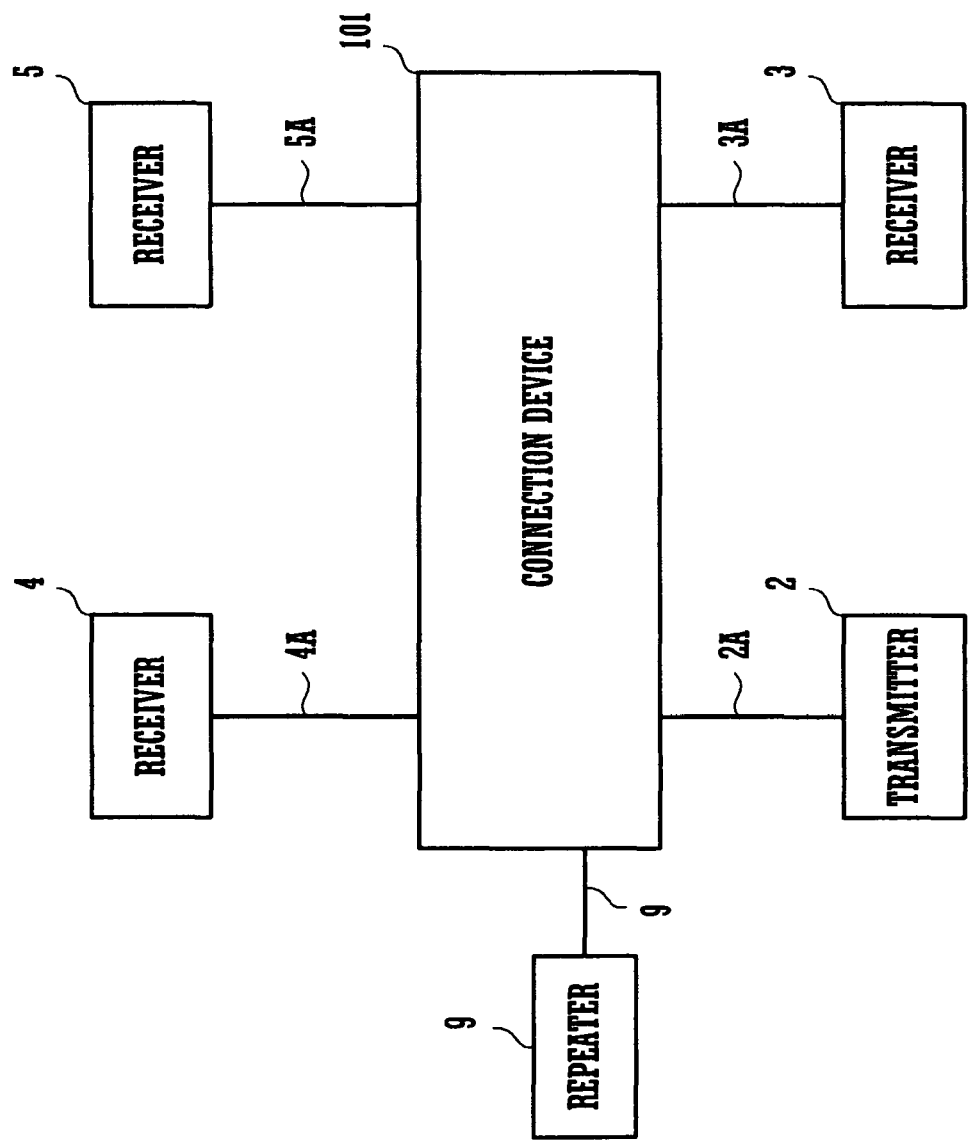
FIG. 6 is a schematic figure showing a situation in which a transmitter and a plurality of receivers are connected together by a connection device for selecting an optimum receiver which is another embodiment of the present invention.
Figure 7:
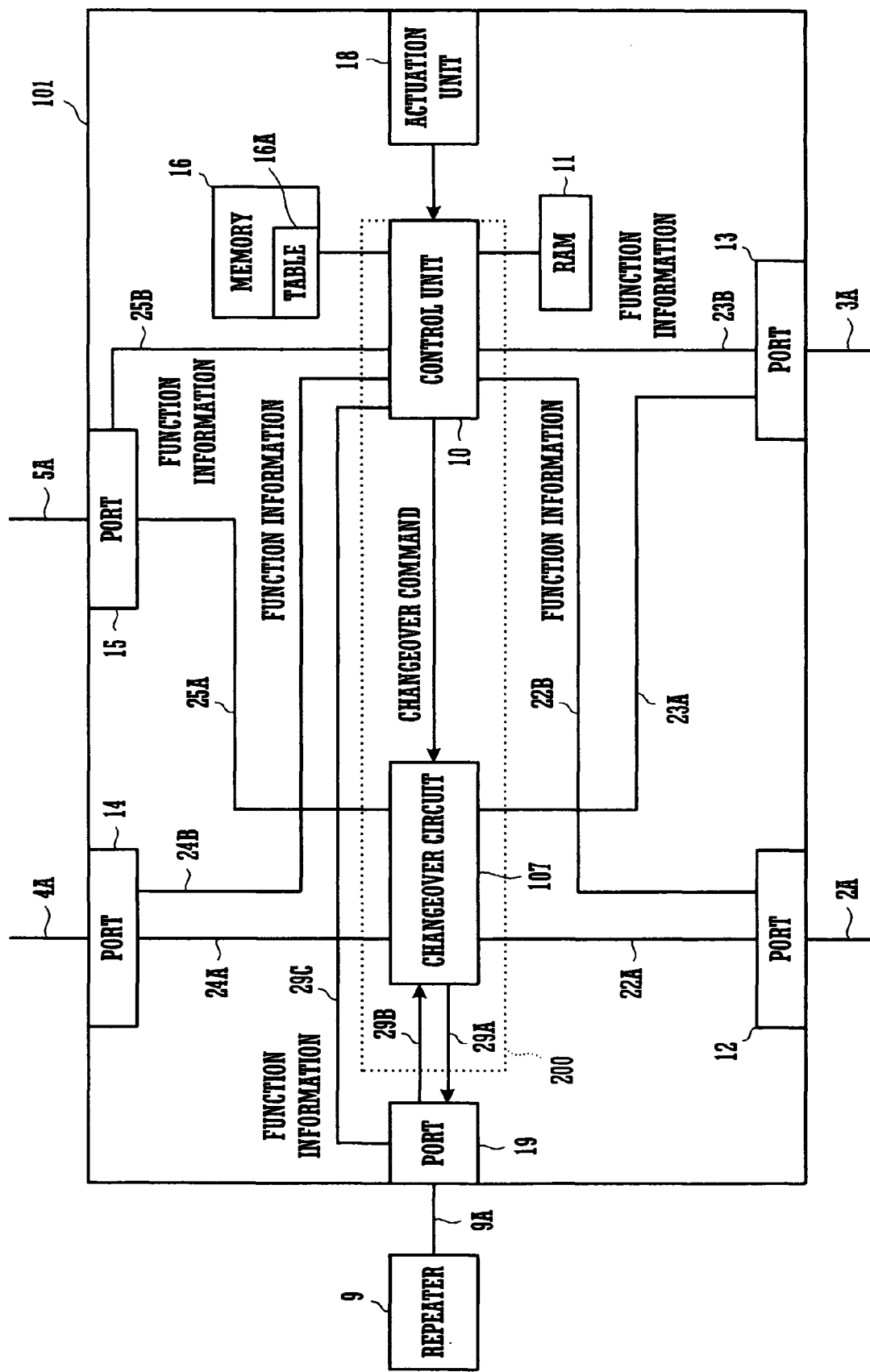
FIG. 7 is a block diagram showing the structure of the main portion of this connection device for selecting an optimum receiver which is another embodiment of the present invention.

FIG. 6 is a schematic figure showing a situation in which a transmitter and a plurality of receivers are connected together by a connection device for selecting an optimum receiver which is this other embodiment of the present invention. And FIG. 7 is a block diagram showing the structure of the main portion of this connection device for selecting an optimum receiver which is this other embodiment of the present invention.

The aspect in which the connection device for selecting an optimum receiver 101 shown in FIG. 6 differs from the connection device for selecting an optimum receiver 1 shown in FIG. 1, is that a repeater 9 is further connected. This repeater 9 may be, for example, an audio output unit which houses a speaker internally. The repeater 9 is connected to a port 19 of the connection device for selecting an optimum receiver 101 via a HDMI cable 9A.

It should be understood that this repeater 9 corresponds to the "repeater" of the Claims. Furthermore, the port 19 corresponds to the "third port" of the Claims.

Here, the repeater 9 receives the audio signal which is transmitted from the transmitter 2 and outputs it as a replay signal. Furthermore, the repeater 9 relays the image signal which is transmitted from the transmitter 2. During this relaying, the repeater 9 amplifies the electrical signal, thus increasing the maximum possible transmission distance.

The HDMI cable 9A is a cable which transmits the image and audio signals from the connection device for selecting an optimum receiver 101 to the repeater 9. This HDMI cable 9A also serves as a cable for transmitting image signals which have been relayed by the repeater 9 to the connection device for selecting an optimum receiver 101.

Furthermore, as shown in FIG. 7, the aspect in which the structure of the connection device for selecting an optimum receiver 101 differs from the structure of the connection device for selecting an optimum receiver 1 shown in FIG. 1, is that it further comprises transmission lines 29A, 29B for transmitting image data or audio data, a control line 29C for acquiring function information which will be described hereinafter, a changeover circuit 107 which changes over these transmission lines 29A, 29B, and a transmission control unit 200. The port 19 is endowed with an HPD function, and detects the presence or absence of connection to the repeater 9 by the HDMI cable 9A. And this port 19 transmits to the control unit 10, via the transmission line 29C, information which has been obtained from the HPD indicating the presence or absence of such connection.

The transmission control unit 200 comprises the changeover circuit 107 which links together the transmission line 22A and any one of the transmission lines 23A through 25A, thereby connecting together the transmitter 2 and any single one from among the plurality of receivers 3 through 5, and a control unit 10 which controls the operation of the various sections of the connection device for selecting an optimum receiver 1.

And a device information table 16B is a table in which, in addition to the transmitter function information and the receiver function information described above, also repeater function information is stored which specifies the functions of the repeater 9 during audio output. This transmitter function information, receiver function information, and repeater function information in the device information table 16B may be stored, for example, as shown in FIG. 8.

FIG. 8 is a figure showing a first example of a format for contents stored in the device information table 16B of this connection device for selecting an optimum receiver which is another embodiment of the present invention. And FIG. 9 is a figure showing a second example of a format for the contents stored in the device information table 16B of the connection device for selecting an optimum receiver which is another embodiment of the present invention.

Figure 10:
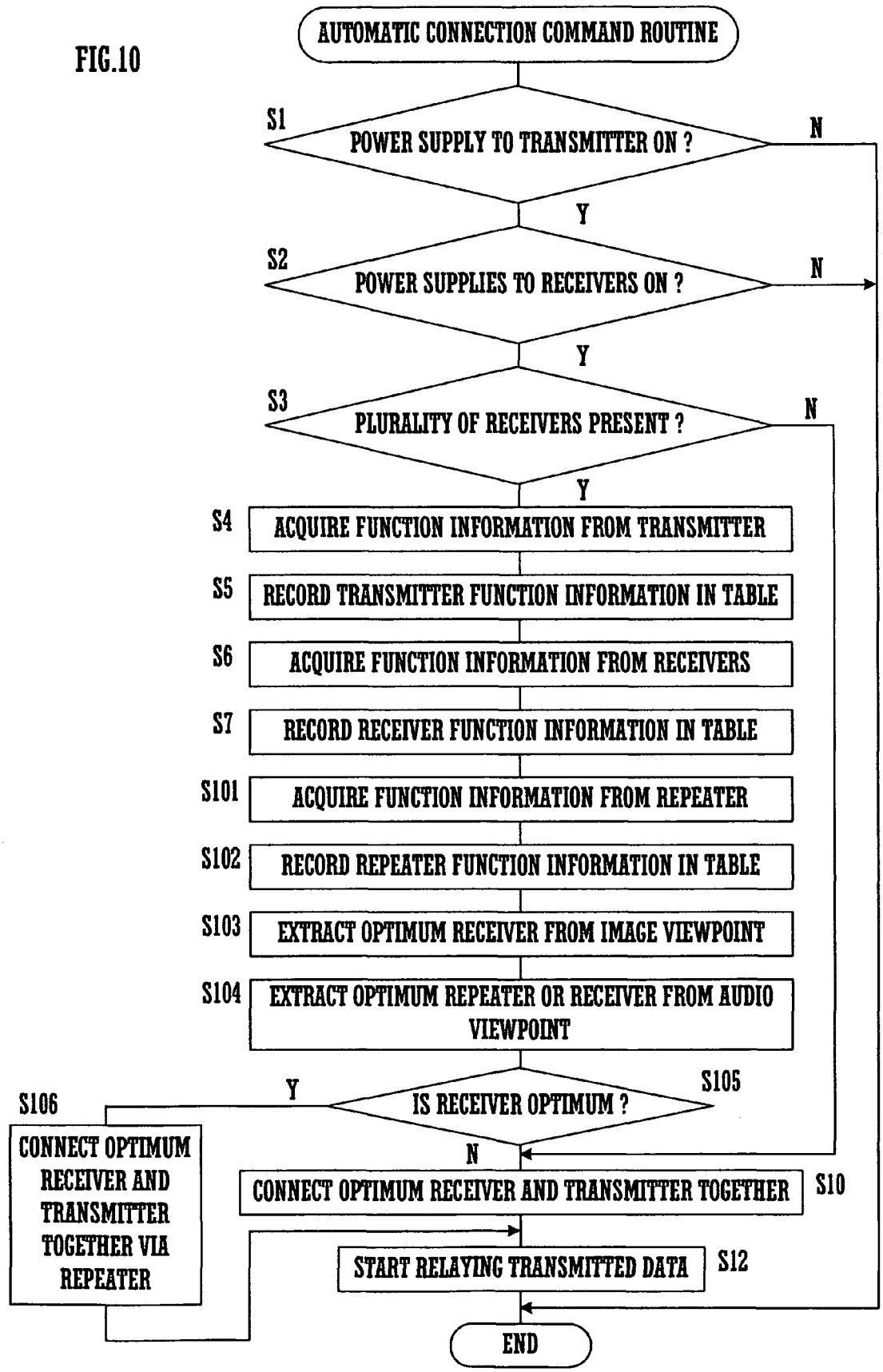
FIG. 10 is a flow chart showing operations performed by a control unit of this connection device for selecting an optimum receiver which is another embodiment of the present invention.

FIG. 10 is a flow chart showing operations performed by a control unit of this connection device for selecting an optimum receiver which is another embodiment of the present invention. In these operations, the steps S8, S9, and S11 in the FIG. 4 flow chart have been replaced by steps S101 through S106, while the other operations (S1 through S7, S10, and S12) are the same. Furthermore, these operations presuppose that, apart from the transmitter 2 and the plurality of receivers 3 through 5, also the repeater 9 is connected to the connection device for selecting an optimum receiver 101.

After the operations of the steps S1 through S7, the control unit 10 acquires repeater function information from the repeater 9 (the step S101).

And the control unit 10 records this repeater function information in the device information table 16B (the step S102).

When this is done, the transmitter function information, the receiver function information, and the repeater function information in the device information table 16B are stored as shown in, for example, FIG. 8 or FIG. 9.

It should be understood that the control unit 10 skips the steps S101 and S102 if the power supply to the repeater 9 is not turned ON. The control unit 10 ascertains whether or not the power supply to the repeater 9 is turned on via the HPD function described above.

Next, the control unit 10 extracts (selects) from the device information table 16B, as the optimum receiver, that receiver which is endowed with functions which are closest to the functions of the transmitter 2 during image output (the step S103). Now an example of an extraction method will be described.

The receivers 3 through 5 support certain image functions as shown in FIG. 8. In concrete terms, the receiver 3 supports three of the functions of the transmitter 2. On the other hand, the receiver 4 supports four of the functions of the transmitter 2. Moreover, the receiver 5 supports two of the functions of the transmitter 2.

According to the above, the receiver 4 constitutes the device which is endowed with functions which are closest to the image functions of the transmitter 2. In the same manner, in FIG. 9, the receiver 4 constitutes the selected device.

Next, the control unit 10 extracts (selects), from the device information table 16B, that receiver or repeater which is endowed with functions which are closest to the functions of the transmitter 2 during audio output (the step S104). Now an example of an extraction method will be described.

The receivers 3 through 5 and the repeater 9 support certain functions during audio processing, as shown in FIG. 8. In concrete terms, the receivers 3 through 5 support Dolby Digital, which is the function of the transmitter 2 during audio output. Furthermore, the repeater 9 supports Dolby Digital, which is the function of the transmitter 2 during audio output.

According to the above, the repeater 9 constitutes that device which is endowed with functions which are closest to the functions of the transmitter 2 during audio output. In the same manner, in FIG. 9, the receiver 3 constitutes the selected device.

And the control unit 10 decides whether or not that device, among the receivers 3 through 5 and the repeater 9, which is endowed with functions which are closest to the functions of the transmitter 2 during audio output, is the repeater 9 (the step S105). Since in FIG. 8 this device is indeed the repeater 9, accordingly in this case the result of this decision is affirmative on the other hand, since in FIG. 9 this device is the receiver 3, accordingly in this case the result of this decision is negative.

If it is decided that the closest device is the repeater 9, then the control unit 10 changes over the changeover circuit 107, and connects the optimum receiver which was extracted in step S103 and the transmitter 2 together via the repeater 9 (the step S106). In FIG. 8, the control unit 10 connects together the receiver 4 and the transmitter 2 via the repeater 9. In more detail, the control unit 10 changes over the changeover circuit 107, and, along with linking the transmission line 22A and the transmission line 29A together, also links the transmission line 29B and the transmission line 24A together.

And the control unit 10 starts relaying the image data which is transmitted between the optimum receiver and the transmitter 2 (the step S12), and then terminates this processing. In FIG. 8, the connection device for selecting an optimum receiver 101 relays the image data or the audio data which is transmitted between the receiver 4 and the transmitter 2 via the repeater 9. In more detail, the image or audio signal which has been transmitted from the transmitter 2 is inputted to the repeater 9 via the connection device for selecting an optimum receiver 101. The repeater 9 outputs the audio signal which has been inputted to the exterior as an audio replay signal. Moreover, the repeater 9 amplifies the image signal which has been inputted, and outputs it to the connection device for selecting an optimum receiver 101. This image signal which has been outputted from the repeater 9 is inputted to the receiver 4 via the connection device for selecting an optimum receiver 101. And the receiver 4 processes this image signal which has been inputted, and displays an image based upon this image signal upon its display screen. By doing this, the user is enabled to listen to audio upon the repeater 9 based upon the audio signal, and is able to view an image upon the receiver 4 based upon the image signal.

Due to the above, even if a repeater such as the repeater 9 is interposed, it is possible automatically to connect together the transmitter 2 and the optimum receiver. Accordingly, it is possible adequately to deploy the image functions of the transmitter 2.

Furthermore, since it is not necessary for the user to ascertain the image functions or the audio functions of the devices which are in use, or the audio functions of the repeater 9, accordingly it is possible for the connection to be established without burdening the user with the time and labor which would be required for manually connecting together the transmitter and the optimum receiver.

On the other hand, if in the step S105 it is decided that the closest device is not the repeater 9, then the control unit 10 connects together the optimum receiver which was extracted in the step S103 and the transmitter 2. In FIG. 9, the control unit 10 connects together the transmitter 2 and the receiver 4. In more detail, the control unit 10 changes over the changeover circuit 107, and connects together the transmission line 22A and the transmission line 24A.

And the control unit 10 starts relaying the data which is transmitted between the optimum receiver and the transmitter 2 (a step S12), and then terminates this processing. By doing this, the connection device for selecting an optimum receiver 101 relays the image data or the audio data which is being transmitted between the receiver 4 and the transmitter 2.

What is claimed is:

1. A connection device for selecting an optimum receiver, comprising:
    a single first port to which is connected, via a bidirectional type cable, a transmitter which transmits image data and audio data;
    a plurality of second ports to which are connected, via respective bidirectional type cables, a plurality of receivers which receive the image data and the audio data and output the image data and the audio data as a replay signal;
    a third port to which a repeater is connected via a bidirectional type cable, the repeater receiving the audio data transmitted from the transmitter and outputting the audio data as a replay signal, the repeater relaying the image data transmitted from the transmitter; and
    a transmission control unit which connects the first port, the plurality of second ports, and the third port,
    wherein the transmission control unit comprises:
        first acquisition means which acquires from the transmitter, via the first port, transmitter function information which specifies at least one of the functions of the transmitter during image output and the functions of the transmitter during audio output;
        second acquisition means which acquires from each of the plurality of receivers, via its respective second port, receiver function information which specifies at least one of the functions of the receiver during image processing and the functions of the receiver during audio processing;
        third acquisition means which acquires from the repeater, via the third port, repeater function information which specifies the functions of the repeater during audio processing;

selection means which selects as an optimum receiver, from among the plurality of receivers; based upon the transmitter function information and the receiver function information, that receiver which is endowed with functions closest to at least one of the functions of the transmitter during image output, and the functions of the transmitter during audio output;

decision means which decides, based upon the transmitter function information, the receiver function information and the repeater function information, whether that device from among the plurality of receivers and the repeater, which is endowed with functions closest to the functions of the transmitter during audio output, is the repeater or not; and link means which, if the decision means decides that that device is the repeater, links together the third port and the second port from among the plurality of second ports, which is connected to the optimum receiver, and links together the first port and the third port;

wherein the link means, after the linkage of the first and third ports, along with relaying the image data and the audio data which are both transmitted from the transmitter to the repeater, also relays the image data which is transmitted from the repeater to the optimum receiver.

2. The connection device for selecting the optimum receiver of claim 1, wherein the link means is configured so that:

if the decision means decides that that device is not the repeater, the link means links together the first port and the second port from among the plurality of second ports, which is connected to the optimum receiver; and after the linkage of the first and second ports, the link means relays the image data and the audio data which are both transmitted from the transmitter to the optimum receiver.

* * * * *